Patented Nov. 26, 1940

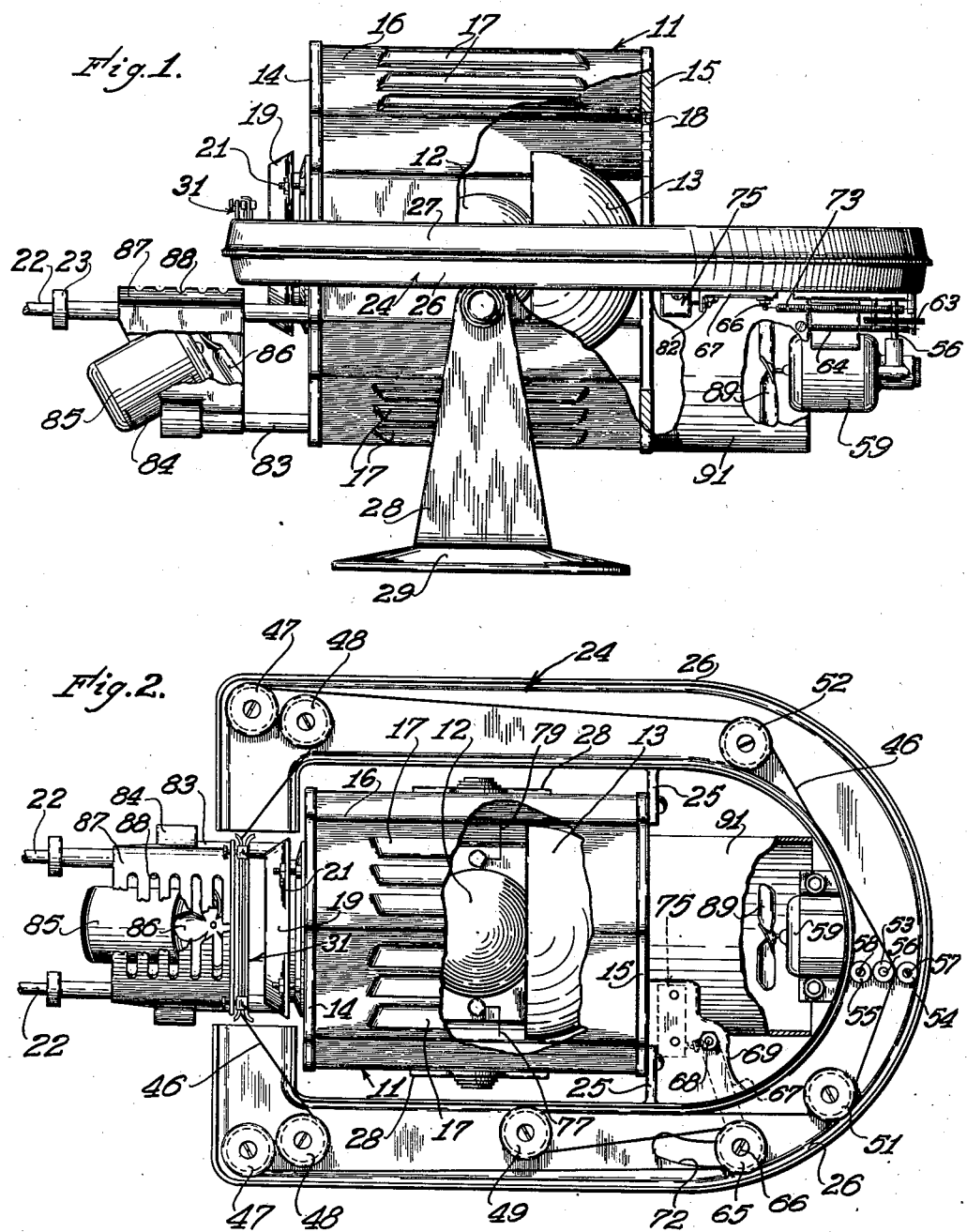

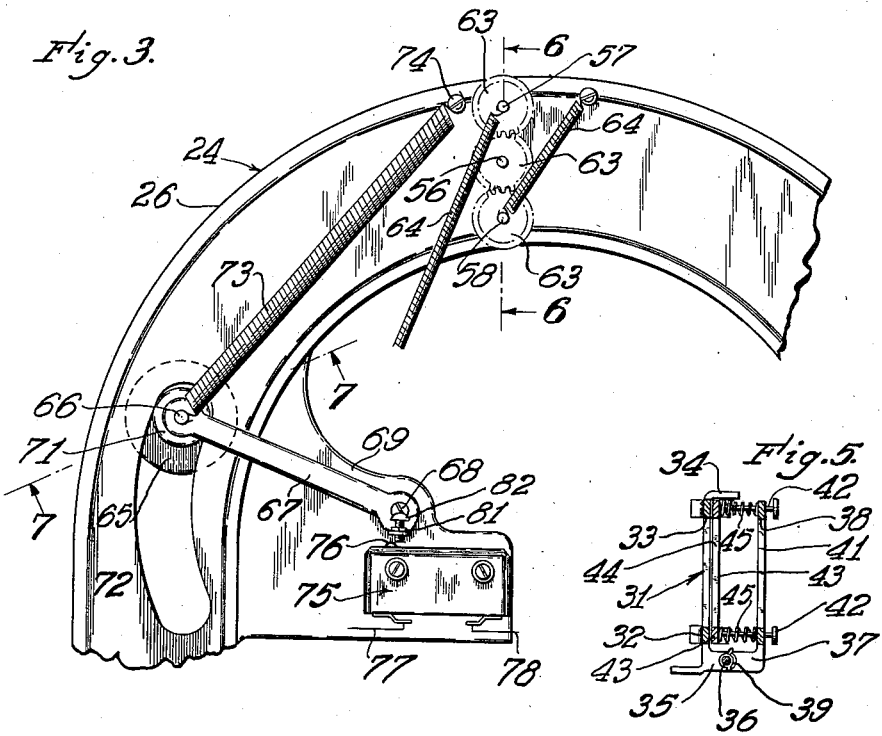
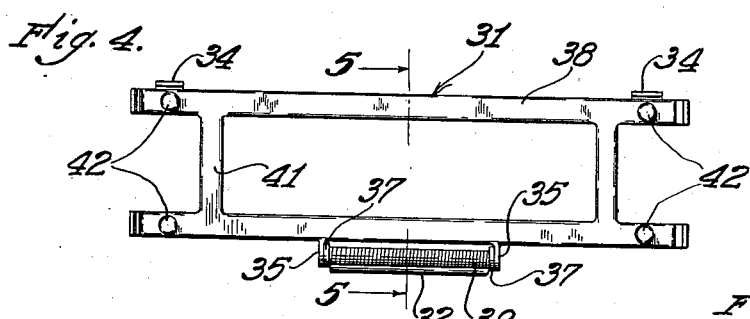
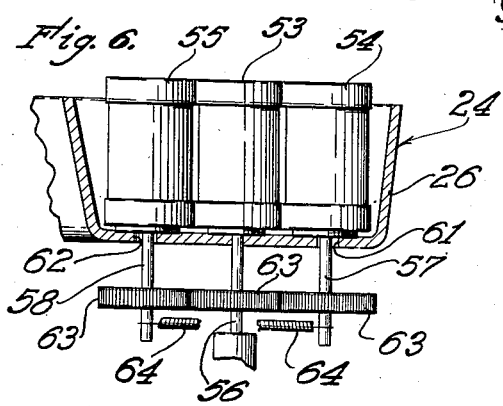
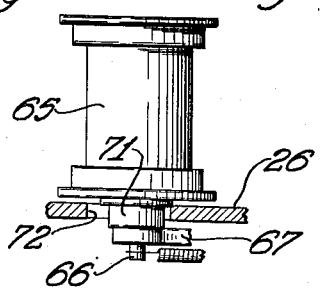

2,222,837

UNITED STATES PATENT OFFICE 2,222,837

SIGN PROJECTION APPARATUS

Maurice H. Goldberg, Chicago, Ill., assignor to Isreal J. London, Laura London, and Burton W. London, as joint tenants, Detroit, Mich.

Application May 29, 1937, Serial No. 145,421

4 Claims. (Cl. 88—28)

This invention relates in general to projection apparatus, and has more particular reference to an improved sign projection apparatus which is adapted to display a moving image continuously.

Heretofore, it has been customary, as disclosed in my co-pending application, Serial No. 118,322, filed December 30, 1936, to positively drive the film employed in such a projection apparatus by means of a spool or gear having teeth which engage suitable apertures provided in the film.

A principal object of the invention, therefore, is the provision in such a projection apparatus of novel friction means for driving the film, which eliminates the necessity of having the usual apertures in the film and may also be employed with film having such apertures.

Another important object of the invention is to provide means for automatically breaking the circuit to the light source or lamp employed, if the film is broken to eliminate the possibility of fire which might result from the film remaining stationary in the light path.

A further object of the invention is the provision in such projection apparatus of a novel gate or film guiding member in the field of the lenses employed therein.

Numerous other objects and advantages of the invention will be apparent as it is better understood from the following description, which, when taken in connection with the accompanying drawings, discloses a preferred embodiment thereof.

In the drawings,

Figure 1 is a side elevational view of a projection apparatus embodying the features of the instant invention with parts of the side wall of the lamp housing and the fan guards broken away;

Fig. 2 is a top plan view of the device of Fig. 1 with the cover for the film housing removed and parts of the fan guards broken away;

Fig. 3 is a detail bottom plan view of the film driving and control mechanism;

Fig. 4 is a detail front elevational view of the film gate;

Fig. 5 is a detail vertical sectional view taken substantially on the line 5—5 of Fig. 4; and Figs. 6 and 7 are detail vertical sectional views taken substantially on the lines 6—6 and 7—7, respectively, of Fig. 3.

Referring more particularly to the drawings, reference numeral 11 indicates in general a lamp housing of any suitable construction within which are mounted a light source or lamp 12, a reflector 13 and condensing lenses (not shown) in well known manner. The lamp housing 11 comprises front and rear walls 14 and 15, respectively, between which is mounted a shell 16 having a series of apertures or louvers 17 in the upper and lower walls thereof. The rear wall 15 (Fig. 1) is provided with a substantially centrally located aperture 18 for a purpose to be later described. The condensing lenses are preferably mounted directly adjacent a suitable aperture in the front wall 14 of the lamp housing 11, and are held in place by a cap member 19 which may be secured to the lamp housing 11 by retaining screws 21. A pair of tubular members 22 are mounted at the forward end of the lamp housing 11 for adjustably supporting the usual object lens (not shown) by means of sliding members 23 mounted thereon.

Surrounding the lamp housing 11 (Fig. 2) is a substantially U-shaped housing 24 which is secured to the lamp housing in spaced relationship thereto by suitable brackets 25. The outer housing 24 comprises a lower channel member 26 from which the brackets 25 extend, and a removable cover member 27 which is complemental to the channel member 26 and is adapted to be secured thereto in any desired manner. The housing 11 and 24 may be mounted for universal adjustment upon a suitable supporting frame 28 and a base or standard 29 pivotally secured thereto in any desired manner.

The forward open end of the outer U-shaped housing 24 terminates adjacent the periphery of the cap member 19. Disposed within this open part of the housing 24 in spaced relationship to the cap member 19 is a film guiding frame member or gate 31. Referring more particularly to Figs. 2, 4 and 5, it will be seen that this gate 31 comprises a stationary frame member 32 having a suitable aperture 33 in the central portion thereof and a pair of forwardly extending arms 34 disposed horizontally above such aperture. At its lower end, the frame member 32 is provided with a pair of forwardly extending ears or bracket members 35.

A cross shaft 36 (Fig. 5) is journalled in the ears 35 of the frame member 32, and a pair of arms or bearing members 37 formed integrally with and extending rearwardly from a movable frame member 38 are journalled on this shaft 36. A coil torsion spring 39 is mounted upon the shaft 36 with the ends thereof so positioned as to urge the frame 38 in a counter-clockwise direction, viewing Fig. 5, relative to the stationary frame 32. The frame member 38 is provided with an elongated aperture 41 in the central portion thereof which coincides with the aperture 33 in the frame 32 when two frame members are in their normal positions, as shown in the drawings.

An adjusting screw 42 is threaded through the movable frame member 38 adjacent each of the four corners thereof. At their inner ends, the four screws 42 are slidably and rotatably secured to a pressure frame 43 (Fig. 5) which is provided with a suitable aperture 44 in the central portion thereof which coincides with the apertures 33 and 41 when the frame members are in their normal positions. The inner ends of the screws 42 are upset or otherwise formed to limit inward sliding movement of the frame 43 relative to the frame 38 in accordance with the adjustment of the screws. A coil spring 45 is mounted upon each of the screws 42 between the frame members 38 and 43 so as to resiliently urge the frame 43 inwardly to its limit of movement relative to the frame 38, as determined by the particular adjustment of the several screws 42.

Referring to Fig. 2, it will be seen that the film 46 is threaded through the gate member 31 at the forward end of the projection apparatus, in which position it is resiliently retained by the pressure member 43 and the springs 45. In this position, the film 46 extends between the frame members 43 and 32 beneath the horizontally disposed arms 34 of the latter. The tension maintained upon the film by the pressure frame member 43 may be varied by adjusting the several screws 42, as desired. The arms 35 and 37 are so formed as to limit counter-clockwise movement of the frames 38 and 43 by the spring 39 to their vertical position of Fig. 5, or any other suitable means may be provided for accomplishing this purpose. In this manner, the spring 39 has the sole function of resiliently retaining the movable frame members 38, 43 in their vertical position, so that the decrease of tension maintained upon the film by the springs 45 may be accurately adjusted by the screws 42.

Referring again to Fig. 2, it will be seen that a plurality of spools or guide pulleys are rotatably mounted on suitable vertical pivots secured to the channel members 26 at their lower ends, the spools being disposed within the outer housing 24 to provide supporting and guiding means for the endless film 46. These pulleys include a pair of spools 47 positioned adjacent the forward, outer corners of the housing 24, a second pair of spools 48 disposed slightly to the rear and inwardly of the spools 47, another spool 49 substantially centrally located in a longitudinal direction in one side of the housing 24 and two other spools 51 and 52 mounted adjacent the rear curved portions of the housing. Adjacent the central portion of the rear end of the housing 24 is provided a set of three driving rollers 53, 54 and 55 (Figs. 2, 3 and 6), the end portions of which have a greater diameter than their central portions. The rollers 53, 54 and 55 are rigidly secured to their respective shafts 56, 57 and 58. The shaft 56 of the central roller 53 is journalled for rotation in the channel member 26, and is connected at its lower end by means of suitable gearing (not shown) to the shaft of an electric motor 59 (Fig. 1) which is mounted in any desired manner below the film housing 24. The shafts 57 and 58 of the rollers 54 and 55 are disposed within short arcuate slots 61 and 62, respectively, in the bottom surface of the channel member 26 to permit sliding movement of the rollers 54 and 55 relative to the roller 53. Rigidly secured to each of the shafts 56, 57 and 58 below the housing 24 is a suitable driving gear 63. The three gears 63 form a driving train which results in the rollers 54 and 55 being driven in the same direction, which will be opposite to the direction of rotation of the central roller 53, when the two outer gears are in mesh with the central gear on the shaft 56. In order to resiliently maintain the gears in this position, a coil spring 64 is secured at one end to the lower end of each of the shafts 57 and 58, and is anchored in any suitable manner at the other end to a stationary portion of the apparatus.

The rollers 53, 54 and 55 comprise novel friction driving mechanism for the endless film 46, since the enlarged upper and lower portions thereof are adapted to frictionally engage the marginal portions of the film. The mounting of the rollers 54 and 55, as above described, permits the film 46 being readily engaged and resiliently held between either the roller 53 and the roller 54 or the roller 53 and the roller 55, so that it may be driven in either direction through the gate 31. With this arrangement, it will be apparent that the necessity for using film having the usual apertures in the marginal portions thereof will be eliminated, although this driving mechanism may be equally well employed with such film.

Referring to Figs. 1, 2, 3 and 7, an idler pulley 65 is provided which is rotatably mounted in one side of the housing 24 adjacent the curved rear portion thereof upon a vertically disposed shaft 66. Adjacent its lower end, the shaft 66 is rigidly secured to the outer end of a lever 67 which is pivotally secured at 68 at its inner end to a suitable supporting bracket member 69 rigidly secured to or formed integrally with the lower channel member 26 of the housing 24. A roller or washer 71 is mounted upon the shaft 66 between the outer end of the lever 67 and the pulley 65, and is disposed within a suitable arcuate slot 72 in the lower surface of the channel member 26. In this manner, as will be seen from Figs. 2 and 3, the pulley 65 comprises an idler spool which is mounted for limited longitudinal movement relative to the housing 24. A coil spring 73 is secured at one end to the lower end of the shaft 66 and is anchored at its other end at 74 to the housing 24 so as to resiliently maintain the idler pulley 65 and its supporting lever 67 in their rearward position. The endless film 46 is threaded through the gate 31 and around the several pulleys or spools 47, 48, 49, 51, 52, 53 and 65, as shown in Fig. 2. With the above described mounting of the idler spool 65, it will be apparent that considerable variation is permitted in the length of the film 46, the spring 73 tending to maintain the film taut.

Referring more particularly to Fig. 3, a suitable switch mechanism, indicated generally by reference numeral 75, is rigidly mounted upon the supporting bracket 69 adjacent the inner end of the lever 67. This switch 75 is similar in internal construction to that disclosed in U. S. Letters Patent No. 1,960,020 issued to P. K. Mc-Gall on May 22, 1934, and comprises a pair of spring contact members mounted so that one end of one of said members will move with a snap action between two stops upon application of pressure to a portion of the upset end thereof by means of a plunger 76 forming a part of the switch. The plunger 76 herein is indicated by reference numeral 15 in the McGall patent. The spring arm within the switch which is operated by the plunger 76 is normally in engagement with a stop member within the switch to connect the leads 77 and 78, shown in Fig. 3. The lead 77 is connected to one side of the filament of the lamp 12 (Fig. 2), the other side of which filament is connected to a lead 79. The leads 78 and 79 represent the main supply line to the lamp 12, which portion of which is thus normally maintained in closed condition by the switch 75. The application of pressure to the plunger 76 to move the latter inwardly relative to the switch 75 results in a snap action of the spring contacts therein to break this normally closed connection between the leads 77 and 78. It will be understood that the particular details of the switch 75 are not essential to the instant invention, and that any other suitable switch mechanism may be substituted for that disclosed herein and in Patent No. 1,960,020.

The inner end of the lever 67 which supports the idler pulley 65 is provided with a depending bracket 81 (Fig. 3) through which is screwed an adjustable bolt or screw 82. The members 81 and 82 are so mounted upon the lever 67 that, when the lever is pulled to its rearmost position by the spring 73, wherein the roller 71 contacts the rear end of the slot 72, the outer end of the screw 82 will contact the plunger 76 of the switch 75 to apply pressure thereto to break the normally closed contact between the leads 77 and 78. The purpose of this switch mechanism is to break the circuit through the lamp 12, the switch 75 being connected in series therewith, if, for any reason, the endless film 46 is broken. In this manner, the possibility of fire which might result from the film remaining stationary in the light path is entirely eliminated.

Extending forwardly from the lamp housing 11 adjacent the lower end thereof (Figs. 1 and 2) are a pair of rods 83 upon the outer ends of which is mounted an angularly disposed bracket 84. The bracket 84 supports an electric motor 85 so that its shaft is angularly disposed relative to the rods 83 and the front wall of the casing 11. Mounted on the upper and rearward end of the shaft of the motor 85 is a fan 86. A suitable open ended fan guard 87 is mounted in any desired manner upon the bracket 84 and rods 83, and is provided in its upper surface with a plurality of transversely disposed apertures 88. The forward end of the shaft of the driving motor 59 is also provided with a suitable fan 89 rigidly secured thereto in any suitable manner. An open ended fan guard 91 is secured to the rear end of the housing 11 in any suitable manner surrounding the fan 89.

In the operation of the above described projection apparatus, the motor 59 is adapted to continuously drive the endless film 46 through the gate member 31 in the field of the lenses of the projector so that a moving image thereof may be projected upon a suitable screw or other reflecting surface in the usual manner. During continued operation of such a projection apparatus, the lamp or light source 12 generates an appreciable amount of heat which would normally detrimentally affect the film 46 and the operation of the device. The fans 86 and 89, however, are so positioned as to force currents of air between the housings 11 and 24, through the vented lamp housing 11, around the gate or film guide 31, and against and past the condensing lenses in the forward end of the housing 11, to dissipate the heat thus generated within the lamp housing. With this arrangement, and the provision of the improved friction driving mechanism 53 to 64 for the film, the possibility of breakage of the film is materially lessened. The above described arrangement of the idler spool 65, the switch 75 and their associated mechanism provides for an immediate breaking of the circuit of the lamp 12, if the endless film 46 should break. This will prevent any possibility of fire which might result from the film remaining stationary in the path of light from the lamp 12. It will be readily apparent that the switch 75 may be so connected in the circuit of the above described projection apparatus as to also stop the members 59 and 85 when the plunger 76 thereof is depressed by the screw 81, if such an arrangement is desired. The screw 81 provides for accurate adjustment so that the switch 75 will be open when the lever 67 is pulled to its rearmost position by the spring 73.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a film projection apparatus, driving mechanism, comprising a first roller having a smooth outer surface, a second and third roller having smooth outer surfaces positioned adjacent said first roller on opposite sides thereof, means for resiliently maintaining said second and third rollers in contact with said first roller, and means for driving said rollers, whereby the film may be frictionally driven in one direction by said first and second rollers and in the opposite direction by said first and third rollers.

2. In a film projection apparatus, driving mechanism, comprising a first roller having a film-engaging surface, a second and third roller having film-engaging surfaces positioned adjacent said first roller on opposite sides thereof, means for driving said first roller including a gear secured thereto, a gear secured to each of said second and third rollers, and a spring for resiliently maintaining each of said second and third rollers and their associated gears in contact with said first roller and its associated gear, respectively, whereby the film may be driven in one direction by said first and second rollers and in the opposite direction by said first and third rollers.

3. In a projection apparatus having a light source, condensing and object lenses and driving means for moving a film through the field of said lenses, comprising a plurality of rollers with smooth outer surfaces positioned adjacent each other and means for resiliently maintaining said rollers in contact with each other, a guide member mounted in the field of said lenses for guiding the film therethrough, comprising a stationary frame member, a movable frame member mounted on said stationary frame member, means for resiliently maintaining said movable frame member in predetermined position relative to said stationary frame member, and adjustable means mounted on said movable frame member for resiliently engaging the marginal portions of the film.

4. In a projection apparatus having a light source, condensing and object lenses and driving means for moving a film through the field of said lenses, comprising a first roller having a smooth outer surface, second and third rollers having smooth outer surfaces positioned adjacent said first roller on opposite sides thereof and means for resiliently maintaining said rollers in contact with each other, a guide member mounted in the field of said lenses for guiding the film therethrough, comprising a stationary frame member, a second frame member pivotally mounted on said first frame member, means for resiliently maintaining said second frame member in predetermined position relative to said first frame member, a third frame member supportd by said second frame member, spring means for resiliently maintaining said third frame member in contact with the film, and means for selectively adjusting the pressure of said spring means against said third frame member.

MAURICE H. GOLDBERG.